United States Patent
Hwang et al.

(10) Patent No.: US 10,281,013 B2
(45) Date of Patent: May 7, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Wonmin Cho, Hwaseong-si (KR); Seongwook Ji, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/704,816

(22) Filed: Sep. 14, 2017

(65) Prior Publication Data
US 2019/0024758 A1    Jan. 24, 2019

(30) Foreign Application Priority Data
Jul. 21, 2017    (KR) .......................... 10-2017-0092842

(51) Int. Cl.
*F16H 3/66*    (2006.01)
(52) U.S. Cl.
CPC ..... *F16H 3/666* (2013.01); *F16H 2200/0069* (2013.01); *F16H 2200/2012* (2013.01); *F16H 2200/2046* (2013.01)
(58) Field of Classification Search
CPC .... F16H 3/666; F16H 3/66; F16H 2200/0069; F16H 2200/2012; F16H 2200/2046
See application file for complete search history.

(56) References Cited

U.S. PATENT DOCUMENTS

| 7,651,431 | B2 | 1/2010 | Phillips et al. |
| 7,959,531 | B2 * | 6/2011 | Phillips ..................... F16H 3/66 |
| | | | 475/276 |
| 8,007,397 | B2 | 8/2011 | Phillips et al. |

(Continued)

OTHER PUBLICATIONS

Non-Final Office Action dated Jul. 11, 2018 from the corresponding U.S. Appl. No. 15/883,288, 10 pages.

*Primary Examiner* — Charles A Fox
*Assistant Examiner* — Tinh Dang
(74) *Attorney, Agent, or Firm* — Brinks Gilson & Lione

(57) ABSTRACT

A planetary gear train of an automatic transmission is provided to improve power delivery and fuel efficiency by applying six engagement elements to four planetary gear sets to achieve multiple speeds. The planetary gear train includes: input and output shafts; first to fourth planetary gear sets respectively including first to third rotation elements, fourth to sixth rotation elements, seventh to ninth rotation elements, tenth to twelfth rotation elements; and first to eighth shafts. In particular, the first shaft is fixedly connected to the second, sixth and eleventh rotation elements and the input shaft, the fourth shaft is fixedly connected to the fourth, seventh and tenth rotation elements, and the seventh and eighth shafts selectively and respectively connect a transmission housing to corresponding rotation elements of the first and third planetary gear sets, and the corresponding rotation elements are not connected to any shaft among the first to sixth shafts.

11 Claims, 3 Drawing Sheets

(56) References Cited

U.S. PATENT DOCUMENTS

| | | |
|---|---|---|
| 8,052,567 B2 | 11/2011 | Hart et al. |
| 8,808,135 B2 * | 8/2014 | Vahabzadeh ............ F16H 3/666 475/280 |
| 9,494,217 B2 * | 11/2016 | Hart ........................ F16H 3/663 |
| 2015/0133259 A1 | 5/2015 | Nakamura et al. |
| 2015/0267786 A1 | 9/2015 | Hart |
| 2015/0369342 A1 | 12/2015 | Kato et al. |
| 2016/0312860 A1 | 10/2016 | Schilder et al. |

* cited by examiner

FIG. 2

| Speed stages | Engagement elements | | | | | | Gear ratio |
|---|---|---|---|---|---|---|---|
| | C1 | C2 | C3 | C4 | B1 | B2 | |
| D1 | | ● | ● | | | ● | 5.231 |
| D2 | | ● | | | ● | ● | 3.320 |
| D3 | ● | | ● | | ● | ● | 2.168 |
| D4-1 | ● | | | | ● | ● | 1.831 |
| D4-2 | ● | | ● | | | ● | 1.831 |
| D5 | ● | | ● | | ● | | 1.527 |
| D6 | ● | ● | | | ● | | 1.164 |
| D7 | ● | ● | | ● | | | 1.000 |
| D8 | ● | | | ● | | | 0.793 |
| D9 | | | | ● | ● | | 0.635 |
| D10 | | | ● | ● | ● | | 0.576 |
| REV | | | ● | ● | | ● | -3.600 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0092842, filed on Jul. 21, 2017, which is incorporated herein by reference in its entirety.

FIELD

The present disclosure relates to a planetary gear train of an automatic transmission for a vehicle that improves power delivery performance and fuel economy.

BACKGROUND

The statements in this section merely provide background information related to the present disclosure and may not constitute prior art.

Generally, an automatic transmission achieving more speed stages has been developed to enhance fuel efficiency and improve drivability. Recently, increases of oil price has triggered more competition for enhancing fuel efficiency of a vehicle.

In this regards, many researches for reducing weight and enhancing fuel economy through downsizing of an engine and for securing drivability and fuel economy through multiple speed stages of automatic transmissions have been conducted.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve improved efficiency with reduced number of components has been considered in order to increase a fuel efficiency through the multiple-speeds.

In this aspect, in recent years, 8-speed automatic transmissions tend to be implemented for vehicles, and the research and development of a planetary gear train capable of implementing more speed stages has also been actively conducted.

However, a conventional 8-speed automatic transmission typically includes three to four planetary gear sets and five to seven engagement elements (frictional elements). In this case, since the length of the automatic transmission increases, mountability may be deteriorated.

We have discovered that disposing one planetary gear set above another planetary gear set causes significant limitations to structures of automatic transmissions to which parallel planetary gear sets is applied.

SUMMARY

The present disclosure provides a planetary gear train of an automatic transmission for a vehicle having advantages of improving power delivery performance and fuel economy by achieving ten forward speed stages and one reverse speed stage with reduced number of components.

The present disclosure also provides a planetary gear train of an automatic transmission for a vehicle having further advantages of improving silent driving of the vehicle by using operation point positioned at a low rotational speed region of an engine.

A planetary gear train of an automatic transmission for a vehicle according to an exemplary form of the present disclosure may include: an input shaft configured to receive torque from an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotational elements; a first shaft fixedly connected to the second rotation element, the sixth rotation element, and the eleventh rotation element and fixedly connected to the input shaft; a second shaft fixedly connected to the eighth rotation element and fixedly connected to the output shaft; a third shaft fixedly connected to the third rotation element; a fourth shaft fixedly connected to the fourth rotation element, the seventh rotation element, and the tenth rotation element; a fifth shaft fixedly connected to the fifth rotation element; a sixth shaft fixedly connected to the twelfth rotation element; and a plurality of shafts configured to selectively and respectively connect a transmission housing to corresponding rotation elements selected from the rotation elements of the first and third planetary gear sets. In particular, the corresponding rotation elements are not connected to any shaft among the first to sixth shafts.

The plurality of shafts may include: a seventh shaft fixedly connected to the first rotation element and selectively connected to the transmission housing; and an eighth shaft fixedly connected to the ninth rotation element, selectively connected to the third shaft, and selectively connected to the transmission housing.

The second shaft and the sixth shaft are selectively connected to each other, the third shaft and the fourth shaft are selectively connected to each other, and the third shaft and the fifth shaft are selectively connected to each other.

The planetary gear train may further include: four clutches, each of which is configured to selectively connect any two shafts among the eight shafts; and two brakes, each of which is configured to selectively connect the seventh shaft or the eighth shaft to the transmission housing.

The four clutches may include: a first clutch disposed between the second shaft and the sixth shaft; a second clutch disposed between the third shaft and the fourth shaft; a third clutch disposed between the third shaft and the fifth shaft; and a fourth clutch disposed between the third shaft and the eighth shaft.

The two brakes may include: a first brake disposed between the seventh shaft and the transmission housing; and a second brake disposed between the eighth shaft and the transmission housing.

In one aspect, the first planetary gear set is a single pinion planetary gear set which includes a first sun gear as the first rotation element, a first planet carrier as the second rotation element, and a first ring gear as the third rotation element, and the second planetary gear set is also a single pinion planetary gear set which includes a second sun gear as the fourth rotation element, a second planet carrier as the fifth rotation element, and a second ring gear as the sixth rotation element. Similarly, the third planetary gear set is a single pinion planetary gear set including a third sun gear as the seventh rotation element, a third planet carrier as the eighth rotation element, and a third ring gear as the ninth rotation element, and the fourth planetary gear set is a single pinion planetary gear set including a fourth sun gear as the tenth rotation element, a fourth planet carrier as the eleventh rotation element, and a fourth ring gear as the twelfth rotation element.

In another form, the first planetary gear set is a single pinion planetary gear set including a first sun gear as the first rotation element, a first planet carrier as the second rotation element, and a first ring gear as the third rotation element, the second planetary gear set may be a double pinion planetary gear set which includes a second sun gear as the fourth rotation element, a second ring gear as the fifth rotation element, and a second planet carrier as the sixth rotation element, the third planetary gear set may be a single pinion planetary gear set including a third sun gear as the seventh rotation element, a third planet carrier as the eighth rotation element, and a third ring gear as the ninth rotation element, and the fourth planetary gear set is a single pinion planetary gear set comprising a fourth sun gear as the tenth rotation element, a fourth planet carrier as the eleventh rotation element, and a fourth ring gear as the twelfth rotation element.

A planetary gear train of an automatic transmission for a vehicle according to another exemplary form of the present disclosure may include: an input shaft configured to receive torque from an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements. In particular, the first rotation element is selectively connected to a transmission housing, the second rotation element is fixedly connected to the sixth rotation element and the eleventh rotation element and is fixedly connected to the input shaft, the fourth rotation element is fixedly connected to the seventh rotation element and the tenth rotation element and is selectively connected to the third rotation element, the fifth rotation element is selectively connected to the third rotation element, the eighth rotation element is fixedly connected to the output shaft, the ninth rotation element is selectively connected to the third rotation element and is selectively connected to the transmission housing, and the twelfth rotation element is selectively connected to the eighth rotation element.

The planetary gear train may further include: four clutches, each of which is configured to selectively connect one rotation element with another rotation element selected from the rotation elements of the four planetary gear sets; and two brakes, each of which is configured to selectively connect the first rotation element or the ninth rotation element to the transmission housing.

The four clutches may include: a first clutch disposed between the eighth rotation element and the twelfth rotation element; a second clutch disposed between the third rotation element and the fourth rotation element; a third clutch disposed between the third rotation element and the fifth rotation element; and a fourth clutch disposed between the third rotation element and the ninth rotation element.

The two brakes may include: a first brake disposed between the first rotation element and the transmission housing; and a second brake disposed between the ninth rotation element and the transmission housing.

In one aspect, the first planetary gear set is a single pinion planetary gear set including a first sun gear as the first rotation element, a first planet carrier as the second rotation element, and a first ring gear as the third rotation element, and the second planetary gear set is a single pinion planetary gear set having a second sun gear as the fourth rotation element, a second planet carrier as the fifth rotation element, and a second ring gear as the sixth rotation element. In addition, the third planetary gear set is a single pinion planetary gear set which has a third sun gear as the seventh rotation element, a third planet carrier as the eighth rotation element, and a third ring gear as the ninth rotation element, and the fourth planetary gear set is a single pinion planetary gear set including a fourth sun gear as the tenth rotation element, a fourth planet carrier as the eleventh rotation element, and a fourth ring gear as the twelfth rotation element.

In another aspect, the first planetary gear set is a single pinion planetary gear set which includes a first sun gear as the first rotation element, a first planet carrier as the second rotation element, and a first ring gear as the third rotation element, the second planetary gear set is a double pinion planetary gear set which includes a second sun gear as the fourth rotation element, a second ring gear as the fifth rotation element, and a second planet carrier as the sixth rotation element, the third planetary gear set is a single pinion planetary gear set including a third sun gear as the seventh rotation element, a third planet carrier as the eighth rotation element, and a third ring gear as the ninth rotation element, and the fourth planetary gear set is a single pinion planetary gear set including a fourth sun gear as the tenth rotation element, a fourth planet carrier as the eleventh rotation element, and a fourth ring gear as the twelfth rotation element.

The planetary gear train according to the exemplary forms of the present disclosure may achieve ten forward speed stages and one reverse speed stage by combining four planetary gear sets being simple planetary gear sets with six engagement elements.

In addition, the planetary gear train according to the exemplary forms of the present disclosure may achieve speed stages suitable to a rotational speed of the engine due to multiple-speed stages of the automatic transmission. Particularly, silent driving of the vehicle may be improved by using operation point positioned at a low rotational speed region of the engine.

In addition, the planetary gear train according to the exemplary forms of the present disclosure may increase driving efficiency of the engine due to multiple-speed stages and improve power delivery performance and fuel economy.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engagement elements at each speed stage in the planetary gear train according to the first exemplary form of the present disclosure.

DETAILED DESCRIPTION

Figure 1:
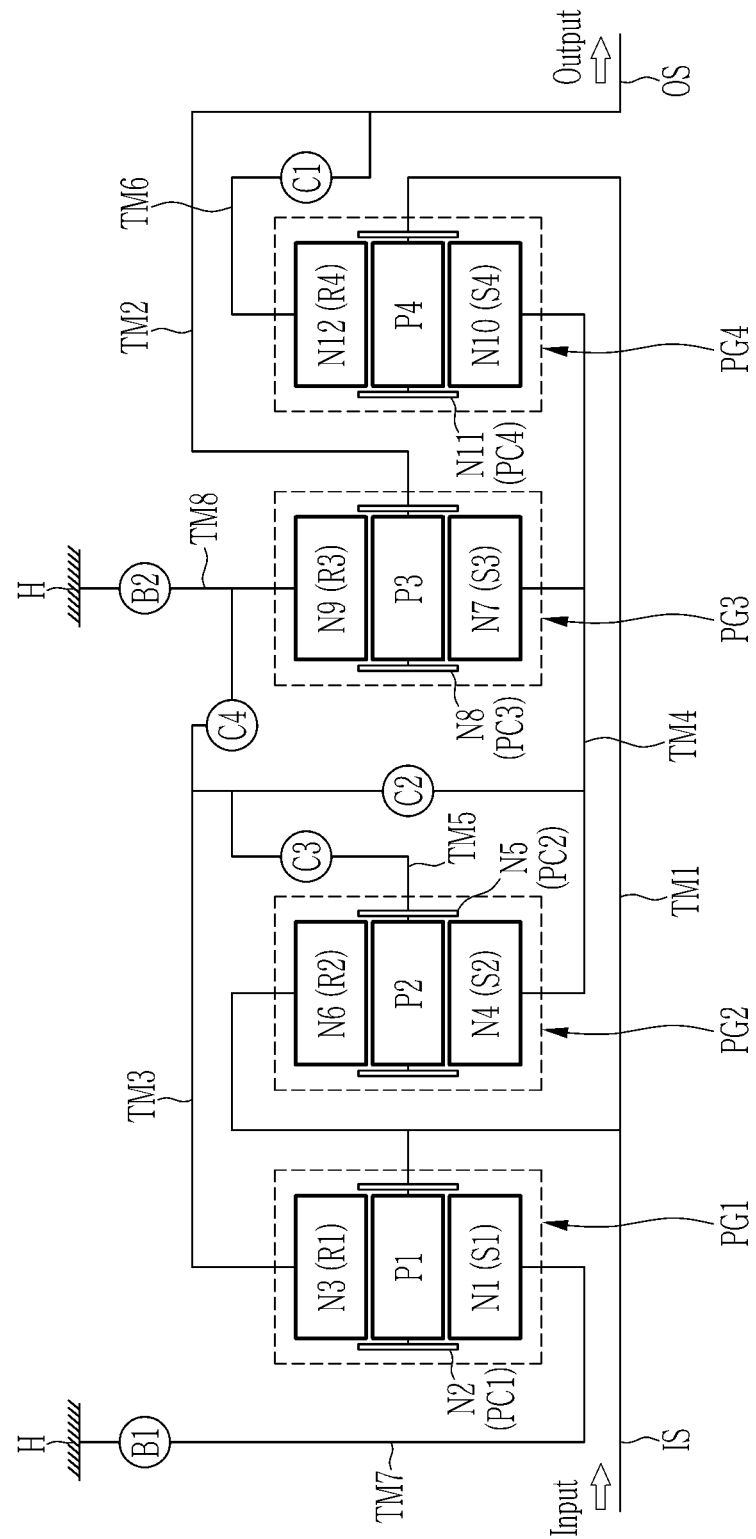
FIG. 1 is a schematic diagram of a planetary gear train according to a first exemplary form of the present disclosure.

Hereinafter, exemplary forms of the present disclosure will be described in detail with reference to the accompanying drawings.

However, parts which are not related with the description are omitted for clearly describing the exemplary forms of the present disclosure. The drawings and description are to be regarded as illustrative in nature and not restrictive, and like reference numerals refer to like or similar elements throughout the present disclosure.

In the following description, dividing names of components into first, second, and the like is to divide the names because the names of the components are the same as each other and an order thereof is not particularly limited.

FIG. 1 is a schematic diagram of a planetary gear train according to a first exemplary form of the present disclosure.

Referring to FIG. 1, a planetary gear train includes: first, second, third, and fourth planetary gear sets PG1, PG2, PG3, and PG4 disposed on the same axis; an input shaft IS; an output shaft OS; eight shafts TM1 to TM8 connected to at least one rotation element of the first, second, third, and fourth planetary gear sets PG1, PG2, PG3, and PG4; engagement elements including four clutches C1 to C4 and two brakes B1 and B2; and a transmission housing H.

Torque input from an engine to the input shaft IS is changed by cooperation of the first, second, third, and fourth planetary gear sets PG1, PG2, PG3, and PG4, and the changed torque is output through the output shaft OS.

According to the first exemplary form of the present disclosure, the planetary gear sets are disposed in a sequence of the first, second, third, and fourth planetary gear sets PG1, PG2, PG3, and PG4 from an engine side.

The input shaft IS is an input member and torque from a crankshaft of the engine is torque-converted through a torque converter to be input into the input shaft IS.

The output shaft OS is an output member, which is disposed in parallel with the input shaft IS, and transmits driving torque to a driving wheel through a differential apparatus.

The first planetary gear set PG1 is a single pinion planetary gear set and includes a first sun gear S1 as a first rotation element N1, a first planet carrier PC1 as a second rotation element N2 rotatably supporting a plurality of first pinion gears P1 engaged with the first sun gear S1, and a first ring gear R1 as a third rotation element N3 engaged with the plurality of first pinion gears P1 and operably connected with the first sun gear S1.

The second planetary gear set PG2 is a single pinion planetary gear set and includes a second sun gear S2 as a fourth rotation element N4, a second planet carrier PC2 as a fifth rotation element N5 rotatably supporting a plurality of second pinion gears P2 evenly disposed on and externally engaged with an exterior circumference of the second sun gear S2, and a second ring gear R2 as a sixth rotation element N6 internally engaged with the plurality of second pinion gears P2 and operably connected with the second sun gear S2.

The third planetary gear set PG3 is a single pinion planetary gear set and includes a third sun gear S3 as a seventh rotation element N7, a third planet carrier PC3 as an eighth rotation element N8 rotatably supporting a plurality of third pinion gears P3 evenly disposed on and externally engaged with an exterior circumference of the third sun gear S3, and a third ring gear R3 as a ninth rotation element N9 internally engaged with the plurality of third pinion gears P3 and operably connected with the third sun gear S3.

The fourth planetary gear set PG4 is a single pinion planetary gear set and includes a fourth sun gear S4 as a tenth rotation element N10, a fourth planet carrier PC4 as an eleventh rotation element N11 rotatably supporting a plurality of fourth pinion gears P4 evenly disposed on and externally engaged with an exterior circumference of the fourth sun gear S4, and a fourth ring gear R4 as a twelfth rotation element N12 internally engaged with the plurality of fourth pinion gears P4 and operably connected with the fourth sun gear S4.

Here, the term "operably connected" or the like means at least two members are directly or indirectly connected with each other. However, two members that are operably connected with each other do not always rotate with the same rotational speed and in the same rotation direction.

The second rotation element N2 is fixedly connected to the sixth rotation element N6 and the eleventh rotation element N11, and the fourth rotation element N4 is fixedly connected to the seventh rotation element N7 and the tenth rotation element N10 by a corresponding shaft selected from eight shafts TM1 to TM8.

Here, the term "fixedly connected" or the like means at least two members are connected to each other to always rotate without rotational speed difference. That is, at least two members that are fixedly connected to each other always rotate with the same rotational speed and in the same rotation direction. Therefore, it is to be understood by a person of an ordinary skill in the art that the term "fixedly connected" or the like differs the term "operably connected" or the like.

The eight shafts TM1 to TM8 will be described in further detail.

The first shaft TM1 is fixedly connected to the second rotation element N2 (first planet carrier PC1), the sixth rotation element N6 (second ring gear R2), and the eleventh rotation element N11 (fourth planet carrier PC4), and is fixedly connected to the input shaft IS to be continuously operated as an input element.

The second shaft TM2 is fixedly connected to the eighth rotation element N8 (third planet carrier PC3) and is fixedly connected to the output shaft OS to be continuously operated as an output element.

The third shaft TM3 is fixedly connected to the third rotation element N3 (first ring gear R1).

The fourth shaft TM4 is fixedly connected to the fourth rotation element N4 (second sun gear S2), the seventh rotation element N7 (third sun gear S3), and the tenth rotation element N10 (fourth sun gear S4).

The fifth shaft TM5 is fixedly connected to the fifth rotation element N5 (second planet carrier PC2).

The sixth shaft TM6 is fixedly connected to the twelfth rotation element N12 (fourth ring gear R4).

The seventh shaft TM7 is fixedly connected to the first rotation element N1 (first sun gear S1).

The eighth shaft TM8 is fixedly connected to the ninth rotation element N9 (third ring gear R3).

The eight shafts TM1 to TM8 fixedly connect a plurality of rotation elements among the rotation elements of the planetary gear sets PG1, PG2, PG3, and PG4 with each other, are rotation members that are connected to any one rotation element and rotate with the any one rotation element to transmit torque, are rotation members that selectively connect any one rotation element with the transmission housing H, or are fixing members that fixedly connect any one rotation element to the transmission housing H.

Here, the term "selectively connected" or the like means that a plurality of shafts including the input shaft and the output shaft are connectable to each other through at least one of the engagement elements to rotate with the same rotational speed and in the same rotation direction, or are connectable to the transmission housing through at least one of the engagement elements to be fixed to the transmission housing.

In other words, in a case that the engagement element selectively connects a plurality of shafts to each other, the plurality of shafts rotate with the same rotational speed and in the same rotation direction when the engagement element operates but the plurality of shafts are disconnected from each other when the engagement element is released.

In addition, in a case that the engagement element selectively connects any one shaft to the transmission housing, the corresponding shaft is fixedly connected to the transmission housing when the engagement element operates but the corresponding shaft is rotatable when the engagement element is released.

The second shaft TM2 is selectively connected to the sixth shaft TM6, and the third shaft TM3 is selectively connected respectively to the fourth shaft TM4, the fifth shaft TM5, and the eighth shaft TM8.

In addition, the seventh shaft TM7 and the eighth shaft TM8 are selectively connected to the transmission housing H to be operated as selectively fixed elements, respectively.

Four clutches C1, C2, C3, and C4 that are engagement elements are disposed at portions at which any two shafts among the eight shafts TM1 to TM8 including the input shaft IS and the output shaft OS are selectively connected to each other.

In addition, two brakes B1 and B2 that are engagement elements are disposed at portions at which any one shaft among the eight shafts TM1 to TM8 is selectively connected to the transmission housing H.

Arrangement of the four clutches C1 to C4 and two brakes B1 to B2 will be described in detail.

The first clutch C1 is disposed between the second shaft TM2 and the sixth shaft TM6 and selectively connects the second shaft TM2 to the sixth shaft TM6.

The second clutch C2 is disposed between the third shaft TM3 and the fourth shaft TM4 and selectively connects the third shaft TM3 to the fourth shaft TM4.

The third clutch C3 is disposed between the third shaft TM3 and the fifth shaft TM5 and selectively connects the third shaft TM3 to the fifth shaft TM5.

The fourth clutch C4 is disposed between the third shaft TM3 and the eighth shaft TM8 and selectively connects the third shaft TM3 to the eighth shaft TM8.

The first brake B1 is disposed between the seventh shaft TM7 and the transmission housing H and selectively connects and fixes the seventh shaft TM7 to the transmission housing H.

The second brake B2 is disposed between the eighth shaft TM8 and the transmission housing H and selectively connects and fixes the eighth shaft TM8 to the transmission housing H.

The engagement elements including the first, second, third, and fourth clutches (C1, C2, C3, and C4) and the first and second brakes (B1 and B2) may be multi-plates friction elements of wet type that are operated by hydraulic pressure. Multi-plates friction elements of wet type are mainly used as the engagement elements, but dog clutches, electric clutches, or magnetic clutches that can be operated by electric signal from an electric control unit can be used as the engagement elements.

FIG. 2 is an operation chart of engagement elements at each speed stage in the planetary gear train according to the first exemplary form of the present disclosure.

Referring to FIG. 2, three engagement elements among the first, second, third, and fourth clutches (C1, C2, C3, and C4) and the first and second brakes (B1 and B2) are operated at each speed stage in the planetary gear train according to the first exemplary form of the present disclosure.

The second and third clutches C2 and C3 and the second brake B2 are operated at a first forward speed stage D1.

In a state that the third shaft TM3 is connected to the fourth shaft TM4 and the fifth shaft TM5 by operation of the second and third clutches C2 and C3, torque of the input shaft IS is input to the first shaft TM1.

At this state, the eighth shaft TM8 is operated as the fixed element by operation of the second brake B2. Therefore, the torque of the input shaft IS is shifted into the first forward speed stage, and the first forward speed stage is output through the output shaft OS connected to the second shaft TM2.

The second clutch C2 and the first and second brakes B1 and B2 are operated at a second forward speed stage D2.

In a state that the third shaft TM3 is connected to the fourth shaft TM4 by operation of the second clutch C2, the torque of the input shaft IS is input to the first shaft TM1.

At this state, the seventh and the eighth shafts TM7 and TM8 are operated as the fixed elements by operation of the first and second brakes B1 and B2. Therefore, the torque of the input shaft IS is shifted into the second forward speed stage, and the second forward speed stage is output through the output shaft OS connected to the second shaft TM2.

The third clutch C3 and the first and second brakes B1 and B2 are operated at a third forward speed stage D3.

In a state that the third shaft TM3 is connected to the fifth shaft TM5 by operation of the third clutch C3, the torque of the input shaft IS is input to the first shaft TM1.

At this state, the seventh and the eighth shafts TM7 and TM8 are operated as the fixed elements by operation of the first and second brakes B1 and B2. Therefore, the torque of the input shaft IS is shifted into the third forward speed stage, and the third forward speed stage is output through the output shaft OS connected to the second shaft TM2.

The fourth forward speed stage can be achieved in two ways.

The fourth forward speed stage D4-1 in the first way is achieved by operating the first clutch C1 and the first and second brakes B1 and B2.

In a state that the second shaft TM2 is connected to the sixth shaft TM6 by operation of the first clutch C1, the torque of the input shaft IS is input to the first shaft TM1.

At this state, the seventh and the eighth shafts TM7 and TM8 are operated as the fixed elements by operation of the first and second brakes B1 and B2. Therefore, the torque of the input shaft IS is shifted into the fourth forward speed stage, and the fourth forward speed stage is output through the output shaft OS connected to the second shaft TM2.

The fourth forward speed stage D4-2 in the second way is achieved by operating the first and third clutches C1 and C3 and the second brake B2.

In a state that the second shaft TM2 is connected to the sixth shaft TM6 by operation of the first clutch C1 and the third shaft TM3 is connected to the fifth shaft TM5 by operation of the third clutch C3, the torque of the input shaft IS is input to the first shaft TM1.

At this state, the eighth shaft TM8 is operated as the fixed element by operation of the second brake B2. Therefore, the torque of the input shaft IS is shifted into the fourth forward speed stage, and the fourth forward speed stage is output through the output shaft OS connected to the second shaft TM2.

The first and third clutches C1 and C3 and the first brake B1 are operated at a fifth forward speed stage D5.

In a state that the second shaft TM2 is connected to the sixth shaft TM6 by operation of the first clutch C1 and the third shaft TM3 is connected to the fifth shaft TM5 by operation of the third clutch C3, the torque of the input shaft IS is input to the first shaft TM1.

At this state, the seventh shaft TM7 is operated as the fixed element by operation of the first brake B1. Therefore, the torque of the input shaft IS is shifted into the fifth forward speed stage, and the fifth forward speed stage is output through the output shaft OS connected to the second shaft TM2.

The first and second clutches C1 and C2 and the first brake B1 are operated at a sixth forward speed stage D6.

In a state that the second shaft TM2 is connected to the sixth shaft TM6 by operation of the first clutch C1 and the third shaft TM3 is connected to the fourth shaft TM4 by operation of the second clutch C2, the torque of the input shaft IS is input to the first shaft TM1.

At this state, the seventh shaft TM7 is operated as the fixed element by operation of the first brake B1. Therefore, the torque of the input shaft IS is shifted into the sixth forward speed stage, and the sixth forward speed stage is output through the output shaft OS connected to the second shaft TM2.

The first, second, and fourth clutches C1, C2, and C4 are operated at a seventh forward speed stage D7.

The second shaft TM2 is connected to the sixth shaft TM6 by operation of the first clutch C1, and the third shaft TM3 is connected to the fourth shaft TM4 and the eighth shaft TM8 by operation of the second and fourth clutches C2 and C4.

In this case, the first, second, third, and fourth planetary gear sets PG1, PG2, PG3, and PG4 become lock-up states. Therefore, the torque of the input shaft IS input into the first shaft TM1 is output through the output shaft OS connected to the second shaft TM2 without rotational speed change.

The first and fourth clutches C1 and C4 and the first brake B1 are operated at an eighth forward speed stage D8.

In a state that the second shaft TM2 is connected to the sixth shaft TM6 by operation of the first clutch C1 and the third shaft TM3 is connected to the the eighth shaft TM8 by operation of the fourth clutch C4, the torque of the input shaft IS is input to the first shaft TM1.

At this state, the seventh shaft TM7 is operated as the fixed element by operation of the first brake B1. Therefore, the torque of the input shaft IS is shifted into the eighth forward speed stage, and the eighth forward speed stage is output through the output shaft OS connected to the second shaft TM2.

The second and fourth clutches C2 and C4 and the first brake B1 are operated at a ninth forward speed stage D9.

In a state that the third shaft TM3 is connected to the fourth shaft TM4 and the eighth shaft TM8 by operation of the second and fourth clutches C2 and C4, the torque of the input shaft IS is input to the first shaft TM1.

At this state, the seventh shaft TM7 is operated as the fixed element by operation of the first brake B1. Therefore, the torque of the input shaft IS is shifted into the ninth forward speed stage, and the ninth forward speed stage is output through the output shaft OS connected to the second shaft TM2.

The third and fourth clutches C3 and C4 and the first brake B1 are operated at a tenth forward speed stage D10.

In a state that the third shaft TM3 is connected to the fifth shaft TM5 and the eighth shaft TM8 by operation of the third and fourth clutches C3 and C4, the torque of the input shaft IS is input to the first shaft TM1.

At this state, the seventh shaft TM7 is operated as the fixed element by operation of the first brake B1. Therefore, the torque of the input shaft IS is shifted into the tenth forward speed stage, and the tenth forward speed stage is output through the output shaft OS connected to the second shaft TM2.

The third and fourth clutches C3 and C4 and the second brake B2 are operated at a reverse speed stage REV.

In a state that the third shaft TM3 is connected to the fifth shaft TM5 and the eighth shaft TM8 by operation of the third and fourth clutches C3 and C4, the torque of the input shaft IS is input to the first shaft TM1.

At this state, the eighth shaft TM8 is operated as the fixed element by operation of the second brake B2. Therefore, the torque of the input shaft IS is shifted into the reverse speed stage, and the reverse speed stage is output through the output shaft OS connected to the second shaft TM2.

Figure 3:
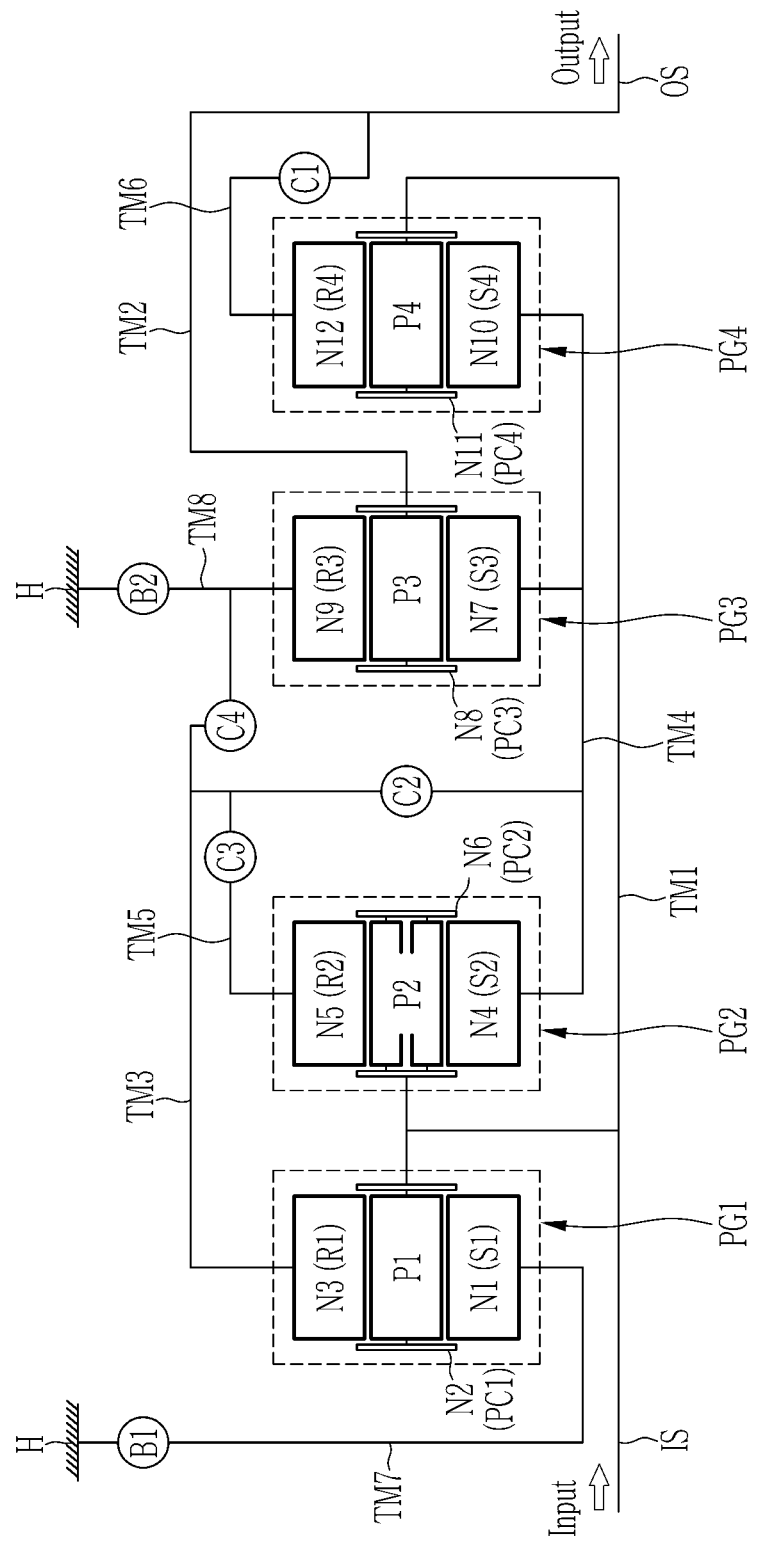
FIG. 3 is a schematic diagram of a planetary gear train according to a second exemplary form of the present disclosure.

FIG. 3 is a schematic diagram of a planetary gear train according to the second exemplary form of the present disclosure.

In the first exemplary form, all the first, second, third, and fourth planetary gear sets PG1, PG2, PG3, and PG4 are single pinion planetary gear sets, whereas in second exemplary form, the second planetary gear set PG2 is a double pinion planetary gear set and the first, third, and fourth planetary gear sets PG1, PG3, and PG4 are single pinion planetary gear sets.

Therefore, the fifth rotation element N5 is changed from the second planet carrier PC2 to the second ring gear R2, and the sixth rotation element N6 is changed from the second ring gear R2 to the second planet carrier PC2.

Here, the eight shafts TM1 to TM8 will be described in further detail.

The first shaft TM1 is fixedly connected to the second rotation element N2 (first planet carrier PC1), the sixth rotation element N6 (second planet carrier PC2), and the eleventh rotation element N11 (fourth planet carrier PC4), and is fixedly connected to the input shaft IS to be continuously operated as an input element.

The second shaft TM2 is fixedly connected to the eighth rotation element N8 (third planet carrier PC3) and is fixedly connected to the output shaft OS to be continuously operated as an output element.

The third shaft TM3 is fixedly connected to the third rotation element N3 (first ring gear R1).

The fourth shaft TM4 is fixedly connected to the fourth rotation element N4 (second sun gear S2), the seventh rotation element N7 (third sun gear S3), and the tenth rotation element N10 (fourth sun gear S4).

The fifth shaft TM5 is fixedly connected to the fifth rotation element N5 (second ring gear R2).

The sixth shaft TM6 is fixedly connected to the twelfth rotation element N12 (fourth ring gear R4).

The seventh shaft TM7 is fixedly connected to the first rotation element N1 (first sun gear S1).

The eighth shaft TM8 is fixedly connected to the ninth rotation element N9 (third ring gear R3).

In addition, the four clutches C1 to C4 and the two brakes B1 to B2 are disposed in the same way as in the first exemplary form. That is, the first clutch C1 is disposed between the second shaft TM2 and the sixth shaft TM6, the second clutch C2 is disposed between the third shaft TM3 and the fourth shaft TM4, the third clutch C3 is disposed between the third shaft TM3 and the fifth shaft TM5, and the fourth clutch C4 is disposed between the third shaft TM3 and the eighth shaft TM8.

In addition, the first brake B1 is disposed between the seventh shaft TM7 and the transmission housing H, and the second brake B2 is disposed between the eighth shaft TM8 and the transmission housing H.

Shifting processes and shift modes according to the second exemplary form of the present disclosure are the same as those according to the first exemplary form of the present disclosure. Therefore, detailed description thereof will be omitted According to the first and second exemplary forms of the present disclosure, ten forward speed stages and one reverse speed stage may be achieved by using four planetary gear sets PG1, PG2, PG3, and PG4, four clutches C1, C2, C3, and C4, and two brakes B1 and B2.

In addition, the planetary gear train according to the first and second exemplary forms of the present disclosure may achieve suitable speed stages according to rotation speed of the engine. Particularly, silent driving of the vehicle may be improved by using operation point positioned at a low rotational speed region of the engine.

Since the planetary gear train according to the exemplary forms of the present disclosure achieves multi-speed stages of the automatic transmission, driving efficiency of the engine may be increased and power delivery performance and fuel economy may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft OS: output shaft
TM1, TM2, TM3, TM4, TM5, TM6, TM7, TM8: first, second, third, fourth, fifth, sixth, seventh, and eighth shafts

What is claimed is:

1. A planetary gear train of an automatic transmission for a vehicle, the planetary gear train comprising:
    an input shaft configured to receive a torque from an engine;
    an output shaft configured to output a torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    a first shaft fixedly connected to the second rotation element, the sixth rotation element, and the eleventh rotation element and fixedly connected to the input shaft;
    a second shaft fixedly connected to the eighth rotation element and fixedly connected to the output shaft;
    a third shaft fixedly connected to the third rotation element;
    a fourth shaft fixedly connected to the fourth rotation element, the seventh rotation element, and the tenth rotation element;
    a fifth shaft fixedly connected to the fifth rotation element;
    a sixth shaft fixedly connected to the twelfth rotation element; and
    a plurality of shafts configured to selectively and respectively connect a transmission housing to corresponding rotation elements selected from the rotation elements of the first and third planetary gear sets, wherein the corresponding rotation elements are not connected to any shaft among the first to sixth shafts.

2. The planetary gear train of claim 1, wherein the plurality of shafts comprise:
    a seventh shaft fixedly connected to the first rotation element and selectively connected to the transmission housing; and
    an eighth shaft fixedly connected to the ninth rotation element, and selectively connected to the third shaft and the transmission housing, and
    wherein the second shaft and the sixth shaft are selectively connected to each other, the third shaft and the fourth shaft are selectively connected to each other, and the third shaft and the fifth shaft are selectively connected to each other.

3. The planetary gear train of claim 2, further comprising:
    four clutches, each of which is configured to selectively connect any two shafts each other selected from the eight shafts; and
    two brakes, each of which is configured to selectively connect the seventh shaft or the eighth shaft to the transmission housing.

4. The planetary gear train of claim 3, wherein the four clutches comprise:
    a first clutch disposed between the second shaft and the sixth shaft;
    a second clutch disposed between the third shaft and the fourth shaft;
    a third clutch disposed between the third shaft and the fifth shaft; and
    a fourth clutch disposed between the third shaft and the eighth shaft, and
    the two brakes comprise:
    a first brake disposed between the seventh shaft and the transmission housing; and
    a second brake disposed between the eighth shaft and the transmission housing.

5. The planetary gear train of claim 1, wherein the first planetary gear set is a single pinion planetary gear set including:
    a first sun gear as the first rotation element,
    a first planet carrier as the second rotation element, and
    a first ring gear as the third rotation element,
    wherein the second planetary gear set is a single pinion planetary gear set including:

a second sun gear as the fourth rotation element,
a second planet carrier as the fifth rotation element, and
a second ring gear as the sixth rotation element, and
wherein the third planetary gear set is a single pinion planetary gear set including:
a third sun gear as the seventh rotation element,
a third planet carrier as the eighth rotation element, and
a third ring gear as the ninth rotation element, and
the fourth planetary gear set is a single pinion planetary gear set including:
a fourth sun gear as the tenth rotation element,
a fourth planet carrier as the eleventh rotation element, and
a fourth ring gear as the twelfth rotation element.

6. The planetary gear train of claim 1, wherein the first planetary gear set is a single pinion planetary gear set including:
a first sun gear as the first rotation element,
a first planet carrier as the second rotation element, and
a first ring gear as the third rotation element,
wherein the second planetary gear set is a double pinion planetary gear set including:
a second sun gear as the fourth rotation element,
a second ring gear as the fifth rotation element, and
a second planet carrier as the sixth rotation element,
wherein the third planetary gear set is a single pinion planetary gear set including:
a third sun gear as the seventh rotation element,
a third planet carrier as the eighth rotation element, and
a third ring gear as the ninth rotation element, and
wherein the fourth planetary gear set is a single pinion planetary gear set including:
a fourth sun gear as the tenth rotation element,
a fourth planet carrier as the eleventh rotation element, and
a fourth ring gear as the twelfth rotation element.

7. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the first rotation element is selectively connected to a transmission housing,
the second rotation element is fixedly connected to the sixth rotation element, the eleventh rotation element, and the input shaft,
the fourth rotation element is fixedly connected to the seventh rotation element and the tenth rotation element and is selectively connected to the third rotation element,
the fifth rotation element is selectively connected to the third rotation element,
the eighth rotation element is fixedly connected to the output shaft,
the ninth rotation element is selectively connected to the third rotation element and is selectively connected to the transmission housing, and
the twelfth rotation element is selectively connected to the eighth rotation element.

8. The planetary gear train of claim 7, further comprising:
four clutches, each of which is configured to selectively connect one rotation element with another rotation element selected from the rotation elements of the four planetary gear sets; and
two brakes, each of which is configured to selectively connect the first rotation element or the ninth rotation element to the transmission housing.

9. The planetary gear train of claim 8, wherein the four clutches comprise:
a first clutch disposed between the eighth rotation element and the twelfth rotation element;
a second clutch disposed between the third rotation element and the fourth rotation element;
a third clutch disposed between the third rotation element and the fifth rotation element; and
a fourth clutch disposed between the third rotation element and the ninth rotation element, and
wherein the two brakes comprise:
a first brake disposed between the first rotation element and the transmission housing; and
a second brake disposed between the ninth rotation element and the transmission housing.

10. The planetary gear train of claim 7, wherein the first planetary gear set is a single pinion planetary gear set, and includes: a first sun gear as the first rotation element, a first planet carrier as the second rotation element, and a first ring gear as the third rotation element,
wherein the second planetary gear set is a single pinion planetary gear set, and includes: a second sun gear as the fourth rotation element, a second planet carrier as the fifth rotation element, and a second ring gear as the sixth rotation element,
wherein the third planetary gear set is a single pinion planetary gear set, and includes: a third sun gear as the seventh rotation element, a third planet carrier as the eighth rotation element, and a third ring gear as the ninth rotation element, and
wherein the fourth planetary gear set is a single pinion planetary gear set, and includes: a fourth sun gear as the tenth rotation element, a fourth planet carrier as the eleventh rotation element, and a fourth ring gear as the twelfth rotation element.

11. The planetary gear train of claim 7, wherein the first planetary gear set is a single pinion planetary gear set, and includes: a first sun gear as the first rotation element, a first planet carrier as the second rotation element, and a first ring gear as the third rotation element,
wherein the second planetary gear set is a double pinion planetary gear set, and includes: a second sun gear as the fourth rotation element, a second ring gear as the fifth rotation element, and a second planet carrier as the sixth rotation element,
wherein the third planetary gear set is a single pinion planetary gear set, and includes: a third sun gear as the seventh rotation element, a third planet carrier as the eighth rotation element, and a third ring gear as the ninth rotation element, and
wherein the fourth planetary gear set is a single pinion planetary gear set, and includes: a fourth sun gear as the tenth rotation element, a fourth planet carrier as the eleventh rotation element, and a fourth ring gear as the twelfth rotation element.

* * * * *